United States Patent [19]
Galos et al.

[11] 3,810,519
[45] May 14, 1974

[54] VEHICLE TRANSMISSION ASSEMBLY

[75] Inventors: Imre Galos, Downers Grove; William C. Swanson, Clarendon Hills; Vaugh A. Nelson, Downers Grove, all of Ill.

[73] Assignee: International Harvester Company, Chicago, Ill.

[22] Filed: Mar. 1, 1972

[21] Appl. No.: 230,700

[52] U.S. Cl. ........... 180/70 R, 74/606 R, 180/64 L, 180/66 R
[51] Int. Cl. ............................................ B60k 17/00
[58] Field of Search ..... 180/64 L, 66 R, 70 R, 6.48; 74/606

[56] References Cited
UNITED STATES PATENTS

| | | | |
|---|---|---|---|
| 1,604,139 | 10/1926 | Werner | 180/64 L |
| 3,687,212 | 8/1972 | Forster | 180/66 R |
| 3,451,571 | 6/1969 | Brisson | 180/64 L |
| 3,688,858 | 9/1972 | Jespersen | 180/89 R |
| 3,241,319 | 3/1966 | Andrews | 180/66 R |

FOREIGN PATENTS OR APPLICATIONS

| 719,526 | 10/1965 | Canada | 180/66 R |
|---|---|---|---|

Primary Examiner—David Schonberg
Assistant Examiner—John P. Silverstrim
Attorney, Agent, or Firm—John A. Schaerli; Floyd B. Harman

[57] ABSTRACT

A frame structure which includes spaced apart extending aligned walls, front and rear plate members, and a center section extending between the walls. Transmission components are built into the frame structure such that an inseperable modularized sound dampening unit is formed.

5 Claims, 4 Drawing Figures

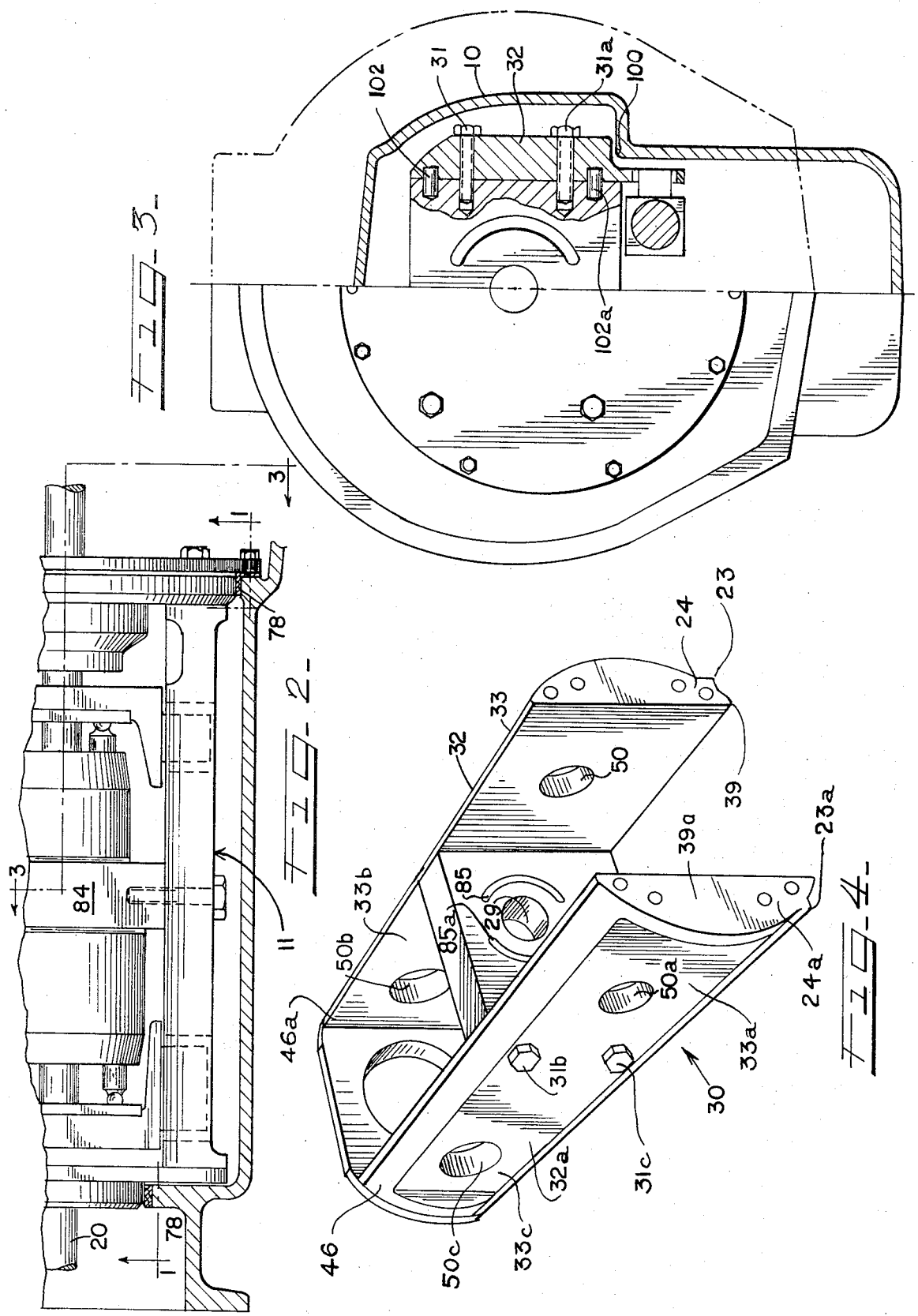

VEHICLE TRANSMISSION ASSEMBLY

BACKGROUND OF THE INVENTION

This invention relates generally to transmission frame assemblies, and more particularly, concerns a modularized frame which not only isolates the noise generating components of the transmission from the vehicle housing, but carries the loads induced thereby. Further the frame is uneffected by externally applied loads to the vehicle housing.

Transmission assemblies of motor vehicles such as a tractor, as a rule, depend on the vehicle housing for support. That is, the components of the transmission are bolted directly to a precision machined housing specifically designed for that purpose. For the most part, the assembly takes place in a "clean room" under such conditions as to prevent dirt, water, etc. from contaminating the transmission assembly. Each of the components is individually placed in the assembly, the unit being literally built up in the vehicle. Such a construction, however, is relatively expensive and costly simply because greater time must be taken because of the lack of adequate working space and the fact that the entire vehicle, or at least a substantial portion of it, must be maintained in a clean room environment.

Additionally hydrostatic pumps and motors, due to high pressure shock, produce substantial noise. In general the amount of noise depends on working pressures, rotative speeds etc. Attempts have been made to minimize the noise by varying the speed of the unit, and/or changing the location size and geometric configuration of the high pressure ports. However, it has been found that performance and allowable movements set limits on noise control by these means. Since these noise generating components of the transmission are affixed directly to the tractor housing, a substantial amount of noise and vibration is transmitted to the operator.

Further, since the vehicle housing must be machined to form a part of the transmission assembly, external loads applied to the tractor housing may result in premature wear or breakage of the transmission components.

It is therefore an object of this invention to provide a transmission assembly which is a modularized unit.

Another object of this invention is to provide a transmission frame for a transmission assembly which carries the components as well as the loads induced thereby.

Another object of the present invention is to provide a transmission frame which is uneffected by externally applied loads to which the tractor housing is subjected.

Still another object of the present invention is to provide a transmission frame on to which the transmission components can be built prior to assembly with the tractor.

Also another object of the invention is to provide a transmission assembled in a frame which is a complete unit within itself and can be simply mated with the tractor assembly and locked into place.

A further object of this invention is to provide a modularized transmission assembly, the frame of which contacts the tractor housing at only two places.

A still further object of this invention is to provide a transmission assembly which is separated from the tractor frame by an isomount material.

A further object of this invention is to provide a transmission assembly which isolates the noise generating components of the transmission from the tractor housing.

Yet another object of this invention is to provide a method for modularizing a tractor transmission.

A further object of this invention is to provide a tractor having a modularized transmisson.

Another object of this invention is to provide a method for mating a modularized transmission assembly with a tractor assembly.

In accordance with the invention, a frame for a transmission is provided which not only forms a part of the transmission assembly, but further serves to isolate the transmission components from direct contact with the housing of the tractor. The frame includes an integral structure comprised of two side rails, two end sections and a center section joining the mid-portions of the two side rails, the top and bottom thereof being open. The transmission components are assembled in the frame in a clean room environment and then packaged for immediate assembly into a vehicle or storage with subsequent use. The housing of the vehicle is modified such that the transmission assembly can be simply slid, like a drawer, thereinto, mating with the appropriate splined shafts. The end section of the frame are provided with an isomount material which further decreases noise transmission from the transmission assembly to the tractor housing. One of said ends is thereafter bolted into the tractor housing to lock in the transmission assembly.

Other objects and advantages of the invention will become apparent upon reading the following detailed description and upon reference to the drawings, in which:

FIG. 2 is fragmentary cross section through the transmission housing;

FIG. 3 is a cross sectional view of the structure shown in FIG. 1 one half thereof being broken away; and FIG. 4 is a front perspective view of the transmission housing without the front end plate.

Figure 1:
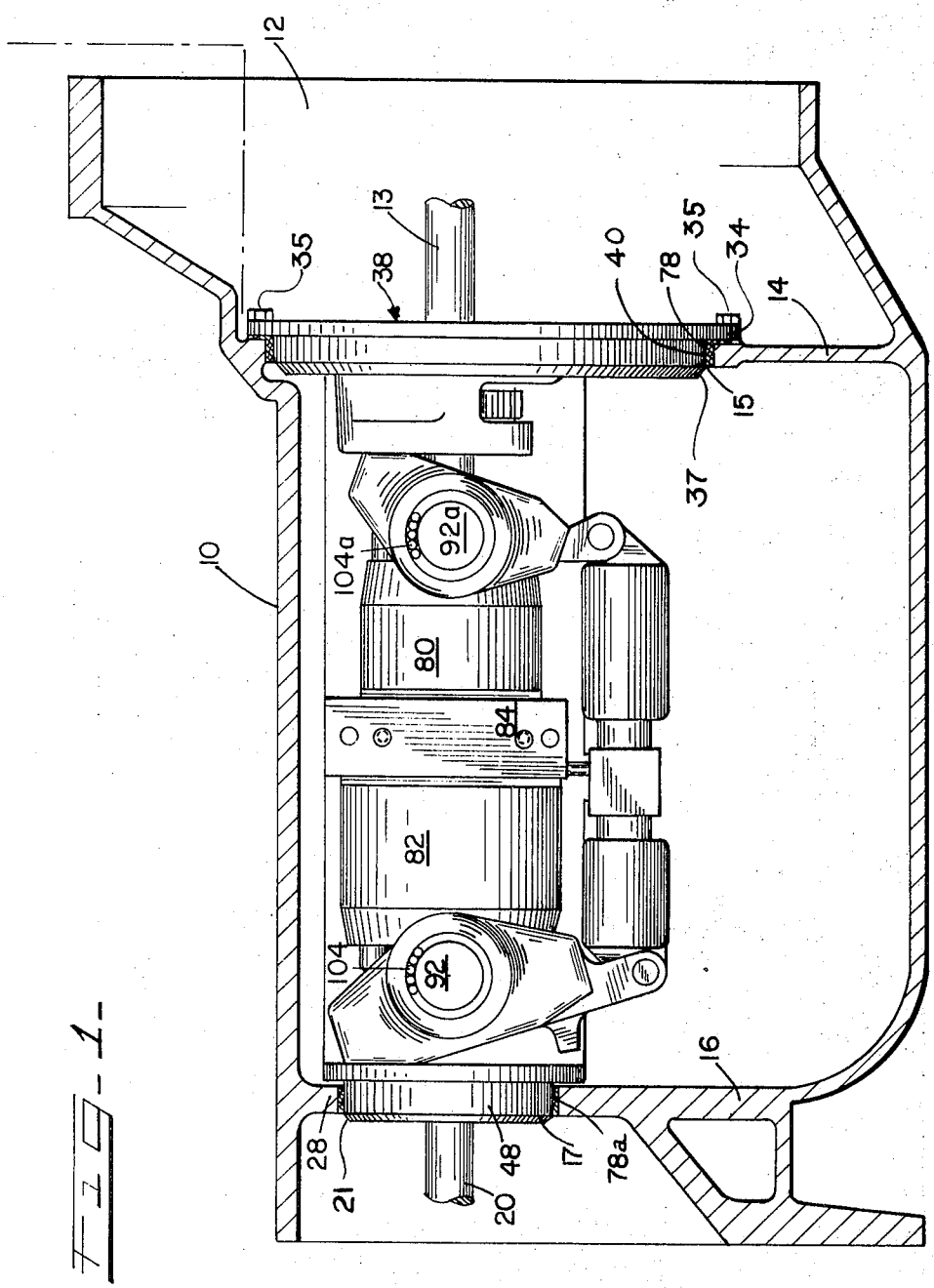
FIG. 1 is a fragmentary side view through the transmission housing assembly in accordance with the present invention.

While the invention will be described in connection with a preferred embodiment, it will be understood that it is not intended to limit the invention to that embodiment. On the contrary, it is endeavored to cover all alternatives, modifications and equivalents as may be included within the spirit and scope of the invention as defined by the appended claims.

DESCRIPTION OF THE PREFERRED EMBODIMENT

Referring now to the drawings, wherein like reference numbers are used throughout the various use to designate like parts, in FIG. 1, reference number 10 designates the tractor housing means which is generally an integral part of the tractor. Forward thereof is flywheel compartment means 12 housing a flywheel (not shown). Tractor housing means 10 includes: a first web section 14 which has a first aperture means 15, and a second web section means 16 having a second aperture means 17.

As shown partially in FIG. 3, the tractor housing means 10 is of a generally key hole configuration having elongated ledge or rail means 100 and 100a (not shown) extending the length thereof.

Referring to FIG. 4, the transmission frame means 30 includes a pair of spaced apart elongated wall means 32 and 32a, each having first and second aperture 50 and 50a in the first half section 33 and 33a, and third and fourth aperture means 50b and 50c in third and fourth half sections 33b and 33c. Joining wall means 33 and 33a across the mid section thereof is a cross member or center section means 84. Alignment of these components as well as those comprising the remainder of the transmission assembly is achieved with a dowel system such as dowel means 102 and 102a. Securing of the junction, in the preferred embodiment, is achieved with a series of bolt and tapped hole means 31, 31a, 31b and 31c, although it is understood that any suitable means would be satisfactory. Center section means 84 is provided with an aperture means 29 and hydraulic fluid ports 85 and 85a, port 85 being for high pressure fluid and port 85a being for low pressure fluid.

End means 46 and 46a of wall means 32 and 32a are provided with a rear mounting plate means 48 fixed thereto by a suitable means such as bolt and threaded hole means (not shown). Plate means 48 is provided with a centrally located aperture means 28 which is journaled by motor output shaft means 20. Edge means 21 of plate means 48 is provided with a taper to facilitate assembly as frame 30 is slid blindly into frame 10 frame the right of FIG. 1.

An elongated ridge or rail means 23 and 23a, extending the length thereof, is provided along the lower edge means 24 and 24a of wall means 32 and 32a. These rail means 23 and 23a key with rail 100 and 100a of housing 10 such that the entire transmission frame assembly means 11 can be slid with very little effort into or out of tractor housing 10. The tapered edge 21 guides end plate 48 up into aperture means 17 and out of contact with rail means 100 and 100a. An isomount means 78a is provided which further separates and isolates plate means 48 from second web section means 16.

A second or front plate means 38 is provided which is secured to end means 39 and 39a of wall means 32 and 32a by a suitable means such as a bolt and tapped hole means (not shown). Front plate means 38 is centrally apertured, being journaled by input shaft means 13 and has a tapered guide edge means 37 upon which the assembly 11 rides up on to raise it off rails 100 and 100a.

Front plate means 38 is further provided with a lip means 34 extending out over face means 40 thereof. Lip means 34 has suitably provided apertures to accommodate bolt means 35 which threadedly engage with correspondingly adjacent tapped hole means in the vehicle frame 10. The transmission housing assembly means 11 is thus secured to frame means 10 with a minimum number of contact points therebetween. Further, in the preferred embodiment as shown in FIG. 1, an isomount means 78 is provided between face means 40, lower lip surface 34 and first web section 14 to further isolate transmission generated noises and forces from the tractor (not shown).

The isomount means 78 and 78a may be constructed of conventional elastomer materials or of a self-dampening alloy composed of manganese, aluminum and copper. A nickel-bearing copper-manganese-aluminum alloy having high dampening capacity is described in U.S. Pat. No. 3,230,078.

The transmission assembly 11 is built up around sections of housing means 10 as was previously stated in a clean room environment. The first step of the assembly procedure includes securing a side wall, either 32 or 32a, to center section 84. The pump means 80 and motor means 82 are secured with trunion means 92, and 92a. The center section 84 provides the interconnecting porting. Needle bearing means 104 and 104a, as shown in FIG. 1, are provided around the trunion means, such that load is not transferred to the frame 10. The next step includes securing the remaining side wall means 32 or 32a to the center section 84, the appropriate trunion means journaling the corresponding aperture means. Rear plate means 48 and front plate means 38 are then secured to the corresponding end sections. As was stated previously dowels are employed to align all sections prior to securement with bolts or other suitable means.

As is apparent the thus assembled transmission assembly 11 can be mated immediately with a tractor construction or packaged in a protective means and stored or shipped to where needed.

The transmission assembly 11 is incorporated into the tractor simply by sliding it thereinto on the previously mentioned rail system. The splined output shaft 20 keys with a suitably provided female member (not shown) while the splined input shaft 13 is keyed to the flywheel (not shown).

Lastly, front plate 38 is bolted to tractor housing 10. A certain amount of free space is provided such that horizontal thermal expansion of the transmission assembly 11 can take place without stress being placed on web section means 14 and 16. Any free movement of the transmission assembly 11 is taken up by the male and female splined systems existing at the front and rear of the assembly.

Thus it is apparent that there has been provided, in accordance with the invention, a vehicle transmission assembly that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What we claim is:

1. A modularized hydrostatic transmission assembly for a motor vehicle for isolating sound generated by the motor and pump members from the vehicle housing and for allowing placement of the assembly as a single unit comprising:

a transmission frame means including, extending apaced apart aligned side wall means, open first and second end means, a center section means transversely disposed between said aligned side walls, carrying and forming a part of said motor and pump means;

a first plate means secured to said first end means;

a second plate means covering said second end means whereby said transmission frame means carries said motor and pump means isolated from said vehicle housing;

a rail means provided in said vehicle housing means for guiding movement of said modularized hydrostatic transmission when as a unit it is subject to movement; and an isomount means separating said vehicle housing means from said first and second plate means whereby the transmission of vibrations generated by said hydrostatic transmission means to said vehicle frame is lessened.

2. The motor vehicle transmission assembly of claim 1 wherein said transmission frame includes:

a series of aperture means in each of said wall means disposed substantially transverse to the axis thereof; and a rail means integral with and extending the length of each of said side wall means, whereby said rail means in said frame means key such that said transmission frame assembly can be moved.

3. The motor vehicle transmission assembly of claim 1 wherein:

said vehicle housing means is provided with first and second apertures, said first aperture carrying said first end plate of said transmission frame and said second end carrying said second end plate of said transmission frame.

4. The motor vehicle transmission assembly of claim 3 wherein said first and second end plates have tapered outer edges whereby upon keying with said aperture means said transmission assembly is raised off said rail means of said vehicle housing.

5. The motor vehicle transmission assembly of claim 4 wherein said center section means is provided with first, second and third aperture means, said first and second apertures being high and low pressure hydraulic fluid ports.

* * * * *

UNITED STATES PATENT OFFICE
CERTIFICATE OF CORRECTION

Patent No. 3,810,519    Dated May 14, 1974

Inventor(s) Imre Galos, William C. Swanson, Vaugh A. Nelson

It is certified that error appears in the above-identified patent and that said Letters Patent are hereby corrected as shown below:

Names should be corrected to appear as follows;

Imre Galos, William C. Swanson, Vaughn A. Nelson

Signed and sealed this 5th day of November 1974.

(SEAL)
Attest:

McCOY M. GIBSON JR.            C. MARSHALL DANN
Attesting Officer              Commissioner of Patents